Patented Oct. 6, 1953

2,654,296

UNITED STATES PATENT OFFICE 2,654,296

PROCESS OF PRODUCING PRIMED HARDBOARD

James B. McCorkle, Evanston, Ill.

No Drawing. Application March 18, 1948,
Serial No. 15,745

4 Claims. (Cl. 92—40)

The present invention relates to hardboard, at least one surface of which has been provided with a coating composition which acts as a priming coat but which is produced under such circumstances as to make it far superior to coating compositions hitherto applied to such products.

Hardboard, as the term is used in the present specification, is a well known article of commerce, being produced by the consolidation of lignocellulosic fibrous materials under heat and pressure, either in the dry condition or while containing considerable amounts of water. The product differs from ordinary cardboard or heavy paper product in that there is present therein a so-called ligneous bond which results from the activation of the ligneous components of the fiber employed, the product being further characterized by lack of grain and by being possessed of many of the characteristics of natural wood, and is usually supplied in a density of anywhere from 50 to 80 pounds per cubic foot, depending upon the degree of compression.

As a further exemplification of the type of process to which the present invention particularly appertains, reference is directed to the following United States patents: Gill, 2,215,246; King and Gill, 2,215,245; Linzell, 2,215,244; Mason, 1,663,505; Mason, 2,130,137; and 2,220,047.

In the industrial use of hardboard, it is frequently desirable to apply decorative coatings thereto, such for example as paint, varnish, lacquer, enamel, and the like.

By reason of the porosity of the hardboard, and to attain the desired degree of excellence in the coatings, it has usually been found necessary to employ a number of coatings of any given finish in order to secure the desired decorative effect.

Customary industrial practice in the decoration of such hardboard involves the application of one or more priming coats, one or more under coats, and one or more finishing coats; thus the proper decoration of such hardboard may require anywhere from 3 to 8 separate coating applications depending upon results desired.

It will at once be appreciated that these numerous finishing operations add inordinately to the cost of the completed finished hardboard article.

The present invention aims to overcome these difficulties by the application to the hardboard by the manufacturers of a superior priming coat which overcomes the aforementioned difficulties.

It is an object of the present invention to prepare a superior form of primed hardboard.

It is a further object of this invention to prepare a primed hardboard that is well adapted for the subsequent application of protective and decorative coatings.

It is still another object of the present invention to produce a primed hardboard which requires fewer coatings of a decorative finish than the prior art products.

It is a still further object of the present invention to prepare a primed hardboard from materials which in their conventional prior art methods of use had been considered as substantially ineffective for the production of priming coats.

It is still a further object of the invention to produce a priming coat on hardboard by reaction between certain proteins and certain components of lignocellulosic material.

Additional objects will become apparent from the further description hereinbelow.

Thus it has been found in accordance with the present invention that it is possible to produce a proteinaceous coating composition on a hardboard by the expedient of coating a suitable lignocellulosic mat consisting of interlaced lignocellulosic fiber with a proteinaceous coating composition, and thereafter consolidating the thus coated mat under heat and pressure.

This may be accomplished by coating a wet or a dry mat, drying, and then pressing the same. It was also discovered that only the proteinaceous coating compositions appear to be suitable for this purpose, as other coating compositions such as oil paints, varnishes, lacquers, synthetic resins, and the like proved to be unsuitable as they caused sticking, burning, blistering, etc., during the pressing operation. On the other hand the proteinaceous coating compositions which may be employed for carrying out the present invention are eminently suited therefor, and moreover are easily obtained, many of them being standard articles of commerce. By the term "proteinaceous coating compositions" it is my intention to include such materials as calcimines, powdered protein pastes, paste protein paints, and protein emulsion paints, especially those in which the protein is either casein, soya bean protein, peanut protein, or a prolamin such as gliadin, etc.

For example, I may employ for the purposes of producing the coating, any preferably suitably pigmented coating composition such for example as that described in Scholz and Randel Patent 1,947,497, or Scholz Patent 2,154,362, or Iddings Patent 2,154,401. As indicative of other similar types of coating compositions, I might mention that it would be possible to use any of those described in the following list of patents: Bradley, 1,722,554, Bradley, 1,780,375; Burden, 1,359,228; Cheetham et al., 2,308,474; Frick, 2,178,474; Frick, 2,178,475; Julian et al., 2,304,102; Menaker, 2,132,243; Powers, 322,851; Scherer, 1,409,472; Scholz, 1,947,498; Scholz et al., 2,177,154; Scholz et al., 2,257,280; Scholz et al., 2,379,402; and Schuler 2,280,546.

The coating compositions which I employ all have one common characteristic, namely that of forming a film which may be designated as a "breathing" film. This means that the film is sufficiently porous to permit the passage of air, water vapor, etc.

It is this quality in the film which permits these types of paints to be applied to so-called "green" plaster walls without the blistering and loss of adhesion usually encountered with oil paints. These so-called "breathing" film paints, however, although they may have good hiding properties, exhibit very poor enamel sealing properties and are therefore considered in the paint industry as being devoid of merit for the production of priming coats. The reason for this is the inherent porosity of these types of proteinacious coatings which renders them too porous and therefore allows subsequently applied lacquers, varnishes, and paints to be absorbed too freely by the base and thus will cause the coatings subsequently applied to be lacking in luster and continuity.

It is therefore quite surprising that I am able to prepare a primed hardboard by the use of coating compositions which ordinarily would be considered as of little value as priming coatings.

Although I do not wish to be bound by any particular theory, it is my belief that the totally unexpected results obtained by the practice of my present invention are brought about by some form of chemical reaction between the coating composition and the lignocellulosic mat during the heat and pressure consolidation thereof. Whether this reaction is between the lignin itself and the protein of the coating, I do not know, because the exact nature of the reaction has not as yet been fully elucidated. The fact remains, however, that the coated surface of my primed hardboard exhibits properties that completely differ from the type of coatings conventionally formed by the hereinabove listed operable coating compositions. Thus, surface of a hardboard which has been provided with a priming coat in accordance with the present invention exhibits an angular sheen in contrast with the flat and non-reflective films produced by most of the prior art priming compositions. Moreover, the surface produced when operating in accordance with the present invention, is, despite the inherent water solubility of proteinaceous coatings, highly resistant to washing and abrasion. Furthermore, the coating shows an increased adhesion to the lignocellulosic body of the hardboard. As a result of this, the primed hardboard of the present invention may subsequently be suitably decorated to produce an attractive and merchantable article by the application of merely a single finishing coat. It will be evident that this is of great value as it is a property which has never previously been achieved with these proteinaceous coating compositions nor with ordinary hardboard.

The proteinaceous compositions employed in carrying out my invention require no special handling or preparation to render them operable.

The protein paste patents and the so-called "interior emulsion paints" are generally to be found on the market in the form of heavy pastes which are diluted by the user to working consistency, the user requiring the addition of about one volume of water for every two volumes of the paste paint. On the other hand, the calcimine and so-called dry powder protein paints may be mixed with water in the ratio of from 3 to 6 pints of water to each 5 pounds of the powder. In carrying out the present invention with commercially available products, I have simply followed the manufacturer's directions to prepare the paints which I then apply in accordance with the examples to be given hereinbelow. There will of course be some variation from the recommended proportions of mixing water to adapt the particular paint to the particular purpose, but this is readily understood by those skilled in the art, and will, of course, differ somewhat with the degree of porosity and the degree of wetness and denseness of the lignocellulosic mat to which the coating composition is applied.

GENERAL EXAMPLE

In applying the present invention to a mat which is to be pressed in a substantially dry condition, this mat may be formed in the well known manner, for example by the methods described in the hereinabove cited patents to Linzell, King and Gill, Gill, or Mason Patents No. 2,220,047 or No. 2,120,137.

To the mat thus produced, I then apply a coating of the suitably thinned proteinaceous composition either by brush, spray, or roller. The coating may be applied either to the dry mat, or may even be applied to the wet mat, immediately after it has emerged from the compression rollers of a board-forming machine, and before it enters the drying oven.

The advantage in so coating a wet mat is that it avoids the necessity of a drying operation and moreover tends to keep the coating more nearly on the surface of the resulting dried mat. The amount of coating to be applied should be sufficient to deposit upon the mat anywhere from about 7 to 18 grams of solids per each square foot of the mat. If the amount of coating is below about 7 grams the hiding power will be poorer than is desirable for a high quality primed hardboard. On the other hand, if the coating weight is above about 18 grams per square foot, there will be a tendency for the coating to undergo what is known as "alligatoring" in the subsequent hot pressing operation. It should be noted, however, that these limits will vary somewhat with the particular proteinaceous coating compositions employed.

It is also important to note that if the coating is applied to a wet mat, the amount of coating applied can be much greater without danger of "alligatoring," it being possible under those conditions to apply the coating to the extent of depositing up to about 60 grams of solids per square foot.

The method of applying the coating may, for instance, be accomplished by the pool and roller method, by spraying, by means of a suitable fountain and scraper, or by any other means desired, including even brushing.

If the subsequent pressing operation is to be effected upon a substantially dry board, the operation may be carried out substantially as follows:

The mat and its coating may be dried to a moisture content of say not exceeding 5%, and preferably not exceeding about 2%, although it will be within the purview of the present invention to dry the board and the coating thereon to a so-called "bone dry" condition. The compression of the coated mat into the final hardboard is preferably accomplished in any suitable hydraulic press, employing pressures of from 500 to 2000 pounds per square inch, with the platens heated to a temperature of from about 450° F. to about 500° F. The time of the application of the pressure is relatively short, and may vary from less than two minutes to a little above two minutes, depending upon the temperature, the time being more or less inversely proportional to the temperature. With the above stated amount of compression it is possible to produce finished primed hardboard ranging in density from about 50 to about 80 pounds per cubic foot.

In general the pressing time may be stated to be from about one to three minutes.

The product issuing from the press is a finished saleable article which requires no further processing. By the reaction hereinabove already indicated, it appears that the priming coating produced on the board contains some reaction product of the ligneous components of the fiber of the board and the protein in the coating. Moreover, the priming coat is very dense and has much higher varnish or lacquer hold-out properties than anything hitherto produced from proteinaceous paints.

This may of course also be due at least in part to the consolidation effected by the pressing operation, as it is evident that the outermost fibers which will of course have been individually coated will have been pushed more closely together and caused to adhere by the natural adhesive effect of the protein binder in the coating compositions. Furthermore, particularly when using highly polished platens, there is a corresponding smoothness which is quite unattainable by ordinary painting operations, consequently the finished article of the present invention may be readily decorated by the purchaser thereof with the minimum use of other coating compositions such as paints, lacquers, varnishes, and enamels.

The following more specific examples are presented for purposes of exemplification, but without intending thereby to limit the invention beyond the broader aspects hereinabove indicated, under the title "General Example."

Example I

To a hardboard mat about 3/4" in thickness and produced from suitably ground wood such as willow, cottonwood, and the like, that is to say, a deciduous wood, there was applied a suitably diluted paste protein paint made in accordance with Scholz Patent No. 2,154,362.

In some cases the predominant pigment in this paint was white, while some samples were also coated with paints which had been tinted deep green, deep blue, medium yellow, black, red, cream, ivory, or gray. The amounts of the coatings applied varied from 7.2 to 12.5 grams per square foot of mat. In these cases the pressing was accomplished with less than 2% of moisture in the mat and coating, and the temperature varied from 470° to 494° F. In all cases except one, the pressure was about 1100 pounds per square inch, and the pressing time two minutes, but in one instance, that at the 494° F. temperature, the pressure was only 900 pounds, and the time of application 1¾ minutes.

One sample was also made at a lower temperature, namely 446° F., with a pressure of 1160 pounds per square inch, and with the time of operation 2¼ minutes. In all of these cases a product was obtained which was of excellent quality and which caused very little difficulty in the hydraulic press from either sticking or fading. It was only with the dark colors such as deep green and deep blue that slight sticking to the platens was encountered, apparently due to the high heat absorbing factors of these tinted coatings, but with the lighter colors, such as ivory, gray, or white, no sticking or blistering was encountered.

Example II

As an example of the variation in the type of coating composition, a similar board was made as in Example I, using the 470° F., 1100 pounds per square inch, and two minute pressing time, with the application of 10.8 grams of dry coating per square foot, the paint composition in this case being a commercial product, having the following label analysis:

| | Percent |
|---|---|
| Oleoresinous emulsion | 43.50 |
| Lead and cobalt naphthenates | .35 |
| Pine oil | .43 |
| Lithopone | 52.00 |
| Mica | 3.72 |
| | 100.00 |

Example III

A similar sample as that made in accordance with Example I, was produced, using however a commercially obtainable exterior paste paint predicated upon an alkyd emulsion. This paint had the following label analysis:

| | Percent | Percent |
|---|---|---|
| Vehicle | | 52.3 |
| Alkyd resin | 28.2 | |
| Protein emulsifier | 7.8 | |
| Water | 62.1 | |
| Pine oil | 1.9 | |
| | 100.0 | |
| Pigment | | 47.7 |
| Zinc sulfide pigment (lithopone) | 95.0 | |
| Mica | 5.0 | |
| | 100.0 | 100.0 |

Example IV

Boards were also made in which a commercially obtainable calcimine was applied in amounts varying from 11.4 to 20.1 grams of solids per square foot, the pressing being accomplished at 470° F. for two minutes, at a pressure of about 1050 to 1100 pounds per square inch. The calcimine employed for this purpose was that prepared in accordance with Scholz Patent 1,947,498. The 60° angular gloss of lacquer superimposed upon these coatings was also measured, and was found to be 60.

Example V

Two more boards were coated with from 13.8 to 15.3 grams per square foot of dry solids using another type of paint also described in the Scholz Patent 1,947,498; the pressing conditions here were 470°, 1050 pounds per square inch, and two minutes. The 60° gloss of thereupon superimposed lacquer was 50.

*Example VI*

Boards were also made by applying a coating composition having the following label analysis:

|  | Percent | Percent |
|---|---|---|
| Vehicle | | 33 |
| Pigment | | 67 |
| Pigment: | | |
| Lithopone | 98 | |
| Mica | 2 | |
| Vehicle: | | |
| Casein solution | 96 | |
| Tung oil | 4 | | and pressing in two cases at 470° for two minutes at 1050 pounds with an application of 11.7 and 13.5 grams per square foot. The 60° angular gloss of superimposed lacquer in that case was 61.

*Example VII*

On still another example a paste protein paint was applied which was identical with that of Example I, using an application of 10.8 grams per square foot and pressing time of 2¼ minutes and 450° under a pressure of 1160 pounds. This yielded a product which showed a 60° gloss of superimposed lacquer of as high as 66.

As a matter of comparison, ordinary commercial hardboard was painted with the same kind of protein paints as used in producing the coatings in accordance with the present invention, which were then allowed to dry, whereupon the same kind of lacquer was superimposed upon the dry coating. The gloss of panels thus finished was only 25. This therefore demonstrates that the coatings of the present invention would allow the application of lacquers which will give at least double the gloss obtainable by merely painting the hardboard with the proteinaceous coating compositions.

SERVICE TESTS

The following tests are illustrative of the increased adhesion and increased resistance to wet abrasion of the priming coats on hardboard made in accordance with my invention. Thus panels of primed hardboard prepared in accordance with the general procedure, and particularly Example I, using a concentration of 12 grams of dry coating per square foot, were tested for resistance to wet abrasion, in comparison with ordinary hardboard of the same type, which had been merely painted after pressing into hardboard with a like amount of the same coating composition. In one test the applied paint was allowed to air dry for five days at room conditions, while in another test the air dried films were baked for fifteen minutes at 410° F. The reason for this baking was to try to simulate the conditions encountered during the pressing operations.

Upon boards so coated there was conducted an abrasion test in accordance with the method fully described in Industrial and Engineering Chemistry, volume 36, page 147 (February 1944). The results were as follows:

The air dried films failed after an average of 43 strokes, while the baked film withstood 268 strokes. Before failure, however, the coatings which were produced in accordance with the present invention, that is to say, those which had been pressed with heat, withstood no less than 750 strokes without any failure even after that time. This was done with several samples to make sure that the result was not merely an accidental one.

It would thus appear that the coatings produced are more than the merely dried protein paint coatings. Not only are the coatings more dense, but they are ever so much more tightly adherent, as witnessed by the abrasion test just mentioned.

It is therefore possible by the practice of the present invention for a manufacturer of hardboard to supply to the consumer a pre-primed hardboard which can be decorated with paint, varnish, enamel or the like with a far less consumption of such additional coating compositions, and with the assurance that even a single application of such other coating compositions will produce the desired gloss and strong adhesion of the applied coatings.

It will of course be evident that the present invention is not predicated upon any particular type of machinery and that therefore it requires no drawings to illustrate the same. The board forming machinery employed for making mats fully known to those conversant with hardboard manufacture, as are also the hydraulic presses commonly employed for this purpose. It may be mentioned, however, that the roller pressing of the mats into hardboard is not to be excluded from the purview of the present invention, and also that the application of the heat during the pressing may be accomplished by use of steam heated or electrically heated platens, or may be developed in the mat and coating by the now well known method of electrostatic heating—using high tension oscillatory electrical fields for that purpose.

By the term "proteinaceous coating compositions" I intend to include such materials as calcimines containing glue, casein, soya bean proteins, peanut proteins, and the various prolamins such as gliadin, zein, and albumens such as blood albumen, egg albumen, and the like.

I claim:

1. Process of producing a primed ligneous hardboard which comprises coating a porous mat of interlaced lignocellulosic fibers with a proteinaceous coating composition, drying the coating, and subjecting the thus coated mat to consolidating pressure within the range of from about 500 to about 2000 pounds per square inch at a temperature range between about 450° F. and about 500° F.

2. The process as defined in claim 1 in which the amount of coating composition is from about 8 to about 60 grams of dry solids per square foot of coated surface.

3. Process of producing a primed lignocellulosic hardboard which comprises coating a light porous blank of interlaced lignocellulosic fibers with a pigmented coating composition containing a proteinaceous binder, drying the applied coating, and thereupon consolidating the blank by pressing it while at a temperature within the range of from about 450° F. to about 500° F. by a pressure within the range of from about 500 to about 2000 pounds per square inch.

4. Process of producing a primed lignocellulosic hardboard which comprises coating a wet light porous blank of interlaced lignocellulosic fibers with a pigmented coating composition containing a proteinaceous binder, simultaneously drying the applied coating and the wet blank, and thereupon consolidating the dried blank by pressing it while at a temperature within the range of from about 450° F. to about 500° F. by a pressure within the range of from about 500 to about 2000 pounds per square inch.

JAMES B. McCORKLE.

References Cited in the file of this patent

UNITED STATES PATENTS

| Number | Name | Date |
|---|---|---|
| 1,927,086 | Ellis | Sept. 19, 1933 |
| 2,030,625 | Ellis | Feb. 11, 1936 |
| 2,080,077 | Howard | May 11, 1937 |
| 2,120,137 | Mason | June 7, 1938 |
| 2,161,655 | Ellis | June 6, 1939 |
| 2,176,981 | Smith et al. | Oct. 24, 1939 |
| 2,215,244 | Linzell | Sept. 17, 1940 |
| 2,215,245 | King et al. | Sept. 17, 1940 |
| 2,338,602 | Schur | Jan. 4, 1944 |
| 2,388,487 | Linzell | Nov. 6, 1945 |
| 2,409,630 | Heritage et al. | Oct. 22, 1946 |
| 2,495,043 | Willey et al. | Jan. 17, 1950 |

OTHER REFERENCES

Paper Trade Journal, May 2, 1940, pp. 35 to 38, inclusive, Plastics and Chemicals from Wood, by Boehm.

Report on the Third International Conference on Timber Utilization, Paris, July 26–28, 1937, No. 16/17, Special No., pp. 94 and 95—"The Influence of Defibration on the Properties of Wallboard," by Holst.